United States Patent [19]
Wright

[11] Patent Number: 5,078,326
[45] Date of Patent: Jan. 7, 1992

[54] MOBILE IRRIGATION EQUIPMENT BELT TRACTION APPARATUS

[76] Inventor: Hubbard L. Wright, 1321-B Anthony Dr., Hays, Kans. 67601

[21] Appl. No.: 645,132

[22] Filed: Jan. 24, 1991

[51] Int. Cl.⁵ .............................................. B05B 3/12
[52] U.S. Cl. ..................... 239/737; 239/735; 305/15; 305/56; 301/43
[58] Field of Search ............... 239/735, 737; 305/15, 305/35 R, 35 EB, 39, 56, 57; 301/41 R, 43

[56] References Cited

U.S. PATENT DOCUMENTS

| | | | |
|---|---|---|---|
| 725,762 | 4/1903 | Nilson | 301/41 R |
| 1,501,097 | 7/1924 | Chase | 305/56 |
| 1,888,627 | 11/1932 | Hecht | 301/43 |
| 1,966,783 | 7/1934 | Balaam | 239/737 |
| 2,429,242 | 10/1947 | Slemmons | 305/56 |
| 2,628,863 | 2/1953 | Maggart | 239/737 |
| 2,711,615 | 6/1955 | Boice, Jr. | 239/737 |
| 2,931,579 | 4/1960 | Ruddell | 239/738 |
| 3,009,646 | 11/1961 | Purtell | 239/737 |
| 3,118,709 | 1/1964 | Case | 305/57 |
| 3,157,193 | 11/1964 | Purtell | 239/737 |
| 3,175,635 | 3/1965 | Bryan | 305/56 |
| 3,211,382 | 10/1965 | Cornelius et al. | 239/737 |
| 3,245,595 | 4/1966 | Purtell | 239/735 |
| 3,281,081 | 10/1966 | Purtell | 239/737 |
| 3,362,492 | 1/1968 | Hansen | 305/35 |
| 3,578,244 | 5/1971 | Erickson | 239/738 |
| 3,680,925 | 8/1972 | Spivy | 305/56 |
| 3,848,936 | 11/1974 | Tsuchiya et al. | 305/35 |
| 4,188,076 | 2/1980 | Pohjola | 305/35 |
| 5,046,785 | 9/1991 | Bockerman | 301/43 |

FOREIGN PATENT DOCUMENTS 291021 7/1967 Australia ............................ 239/735
293781 7/1967 Australia ............................ 239/738

Primary Examiner—Andres Kashnikow
Assistant Examiner—William Grant
Attorney, Agent, or Firm—John R. Flanagan

[57] ABSTRACT

Mobile irrigation equipment includes a water delivery tube, a support frame mounting the tube, and a belt traction apparatus movably mounted to the support frame and operable for moving the support frame over the ground. The belt traction apparatus includes drive wheels rotatably mounted to the support frame and an endless traction belt entrained over the drive wheels for engaging the ground and moving the support frame when the wheels are rotated. Each drive wheel has an annular plate, a central hub rotatably mounted to support frame about an axis, spokes supporting the annular plate on the hub in concentric relation with the rotational axis of the hub, and a plurality of lugs attached to the periphery of the annular plate in circumferentially spaced relation to one another and extending in transverse relation to the annular plate and in radial relation to the rotational axis of the hub. Each lug has a central slot extending from an inner edge of the lug in a radial direction relative to the rotational axis of the hub. The slot provides the means by which the lug is fitted on and attached to the periphery of the annular plate. Also, each lug has an outer recess extending in transverse relation to the slot for receiving the belt entrained over the wheel.

20 Claims, 3 Drawing Sheets

MOBILE IRRIGATION EQUIPMENT BELT TRACTION APPARATUS

BACKGROUND OF THE INVENTION

1. Field of the Invention

The present invention generally relates to mobile irrigation equipment and, more particularly, is concerned with a belt traction apparatus for mobile irrigation equipment.

2. Description of the Prior Art

Irrigation equipment which operates in a circular pattern employs an elongated water delivery pipe having spray outlets spaced along its length. The water delivery pipe is connected to a central standpipe for the supply of water to the delivery pipe and is mounted on a plurality of spaced mobile towers, or support frames, which are driven to rotate the water delivery pipe about the central standpipe.

Heretofore, flotation traction tires have been employed on the support frames. There are many problems associated with the use of flotation tires. First, blown tires are extremely difficult to change under wet, muddy field conditions. Second, such tires make deep ruts in the fields causing the irrigation equipment to become stuck with resultant crop damage and loss of irrigation water and time to get the equipment moving again. Third, the ruts also cause other farm machinery that has to be used in the fields to get stuck or suffer damage when the driver of such equipment fails to see and slow down for the ruts. Fourth, the tire ruts provide channels for excess water runoff and water stagnation. Fifth, the tires tend to spin in the mud as they drive the support frames, thereby wasting energy.

As an alternative to flotation traction tires, it is known to employ belt traction apparatus on irrigation water delivery pipe support frames. One example of a belt traction apparatus is disclosed in Australian Patents 291,021 and 293,781 to Allwood. The apparatus is composed of a pair of spaced wheels entraining a cleated belt. The wheels and belt are driven by a motor and has a pair of inner wheels engaging the inside of a bottom run of the belt and maintaining it against the ground.

While the approach of the cited Australian patents represents a step in the right direction toward alleviating many of the problems associated with flotation traction tires, improvements are still needed to such belt traction apparatus to make them function adequately under the adverse operating conditions of mobile irrigation equipment. Consequently, a pressing need still exists for enhancement of designs for belt traction apparatus for mobile irrigation equipment.

SUMMARY OF THE INVENTION

The present invention provides a belt traction apparatus designed to satisfy the aforementioned needs. The improvement provided in the apparatus of the present invention builds on the basic combination of a plurality of drive wheels rotatably mounted to leading and trailing ends of a support frame which supports an irrigation water delivery tube, a continuous traction belt entrained over the drive wheels for engaging the ground, and at least one power unit mounted to the support frame and drivingly coupled to at least one of the drive wheels for moving the support frame over the ground.

The improvement fostered by the present invention relates to the constructions of the drive wheels and belt of the apparatus. Each drive wheel includes an annular plate, a central hub rotatably mounted to the support frame, means for concentrically supporting the annular plate about a rotational axis of the hub, and a plurality of lugs attached to the periphery of the annular plate in circumferentially spaced relation to one another. The traction belt is entrained about the annular plate and lugs of each wheel.

More particularly, each of the lugs is a triangular-shaped plate extending in transverse relation to the annular plate and projecting outwardly from the annular plate in radial relation to the rotational axis of the wheel hub. Each lug has a central slot extending from an inner apex or corner defined by the triangular plate, in radial direction relative to the rotational axis of the wheel hub, toward an outer base or edge defined by the triangular plate. The slot provides the means by which the lug is fitted on and rigidly attached to the periphery of the annular plate. Each lug also has an outer recess formed in the outer base extending in transverse relation to the slot for receiving the belt.

The traction belt has treads defined on an outer surface of the belt for engaging the ground. The belt also has a plurality of spaced apart transverse channels defined in an inner surface of the belt for receiving the outer edges of the lugs of the wheel defining the outer recesses of the lugs. The belt also has a continuous longitudinal central groove defined in the inner surface of the belt for receiving the periphery of the annular plate extending between the lugs.

The wheels and traction belt of such constructions provide a large footprint which allows improved traction and minimizes formation of ruts. Less energy is needed to run the equipment and reduced damage to crops occurs. Also, the wheel and belt constructions promote self-cleaning and shedding of mud and debris from them as they travel across the ground in moving the mobile irrigation equipment about the fields.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
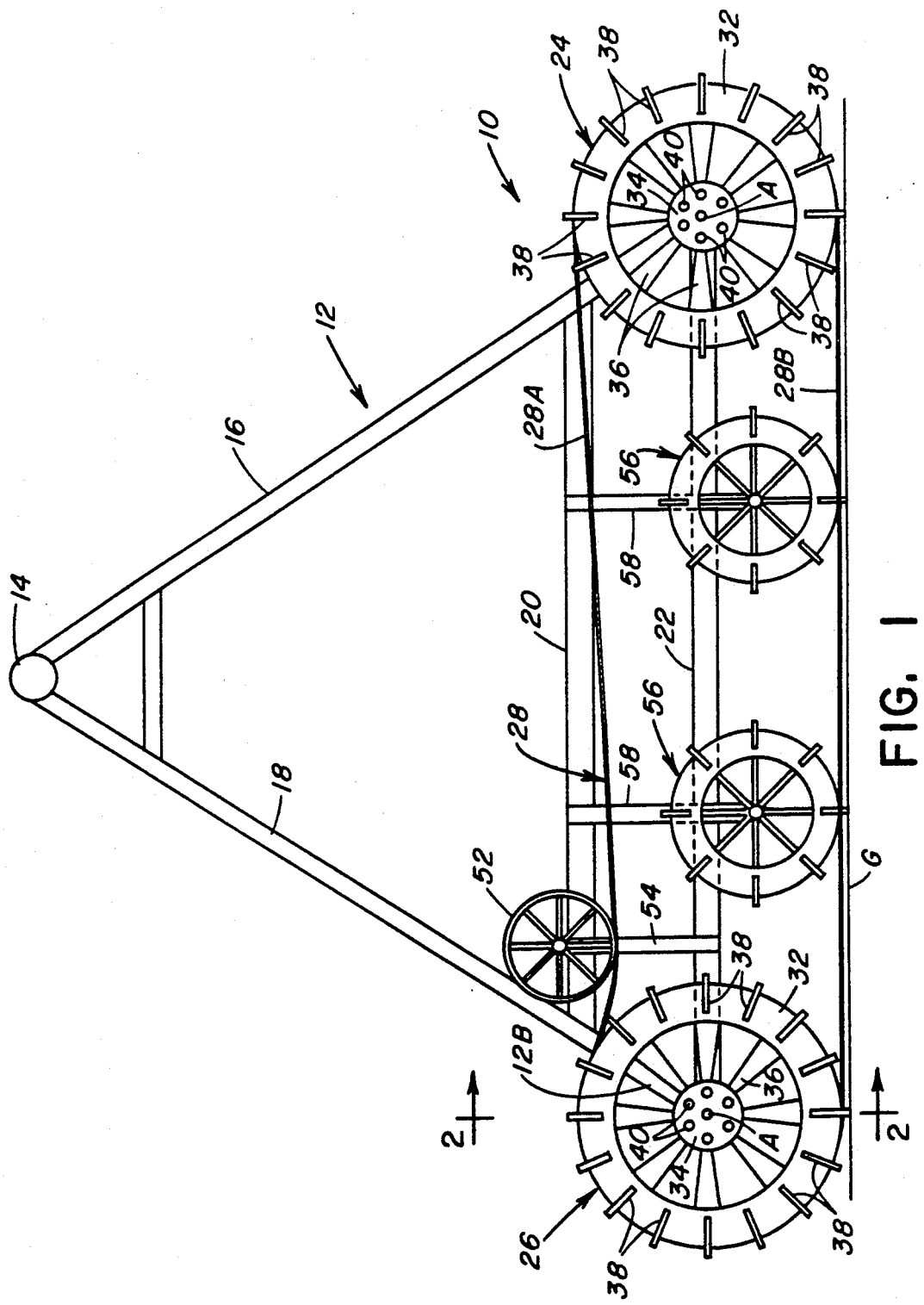
FIG. 1 is a side elevational view of a belt traction apparatus of the present invention mounted to a support frame of irrigation equipment.

In the following description, like reference characters designate like or corresponding parts throughout the several views of the drawings. Also in the following description, it is to be understood that such terms as "top", "bottom", "front", "rear" and the like, are words of convenience and are not to be construed as limiting terms.

Figure 2:
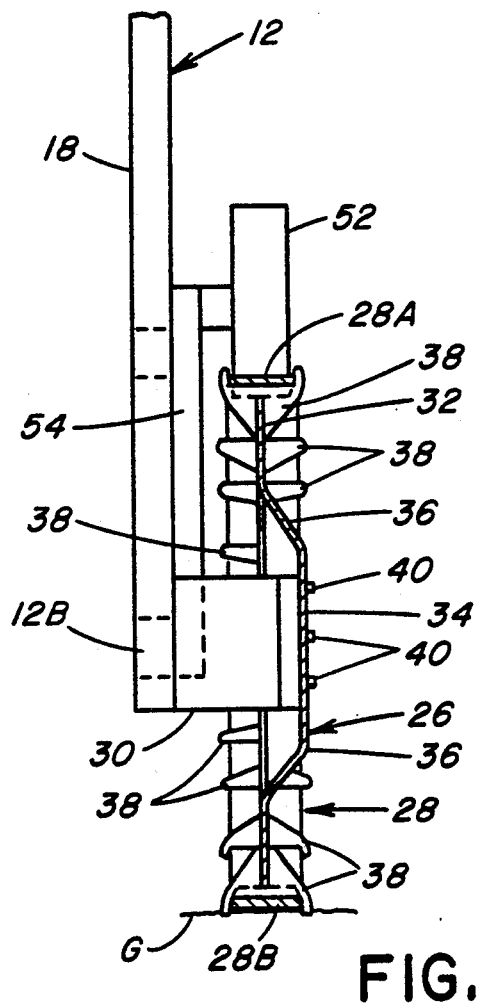
FIG. 2 is an enlarged fragmentary end elevational view of the apparatus as seen along line 2—2 of FIG. 1.
Figure 5:
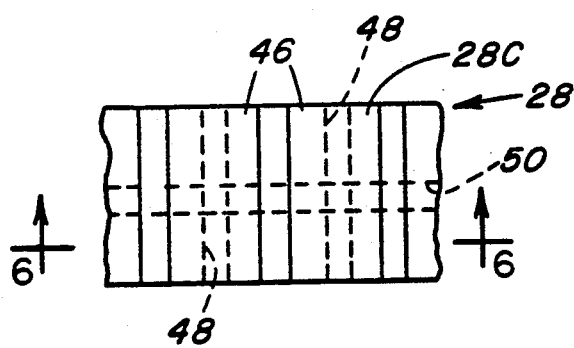
FIG. 5 is a fragmentary top plan view, on a reduced scale, of a traction belt of the apparatus as seen along line 5—5 of FIG. 3.
Figure 6:
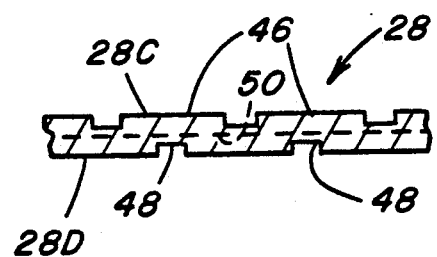
FIG. 6 is a longitudinal sectional view of the traction belt taken along line 6—6 of FIG. 5.

Referring to the drawings, and particularly to FIGS. 1 and 2, there is illustrated a belt traction apparatus, generally designated 10, of the present invention being mounted to an irrigation equipment tower, or support frame, 12 which, in turn, mounts an overhead water delivery tube 14. Typically, the irrigation equipment includes a plurality of support frames 12 spaced from one another and supporting the water delivery tube 14. Each support frame 12 is made mobile by one belt traction apparatus 10 of the present invention which is operable for moving the support frame 12 over the ground G. As an example, the support frame 12 is composed of a pair of inclined forward and rear legs 16, 18 connected at their upper ends to the water delivery tube 14, and a pair of upper and lower horizontal braces 20, 22 which rigidly interconnect the lower ends of the legs 16, 18.

Basically, the belt traction apparatus 10 includes a pair of front and rear drive wheels 24, 26, an endless traction belt 28, and at least one and preferably a pair of power units 30. The front and rear drive wheels 24, 26 of the apparatus 10 are rotatably mounted to leading and trailing corners 12A, 12B of the support frame 12 formed by the connections of the lower ends of the forward and rear legs 16, 18 with the opposite ends of the lower brace 22. The traction belt 28 of the apparatus 10 extends between and is entrained over the drive wheels 24, 26 so as to provide upper and lower horizontal runs 28A, 28B of the belt 28, with the lower run 28B of the belt engaging the ground G.

The power units 30 of the apparatus 10 preferably are mounted to the support frame 12 at the leading and trailing corners 12A, 12B thereof. The power units 30 are drivingly coupled directly to the respective drive wheels 24, 26 and are operable to rotate the wheels and thereby move the traction belt 28 about an endless path. Such movement of the traction belt 28 with its lower run 28B engaged with the ground results in movement of the support frame 12 and thereby the irrigation equipment 10 over the ground. The power units 30 can use any suitable type of motive power, but are preferably electric motors.

Figure 3:
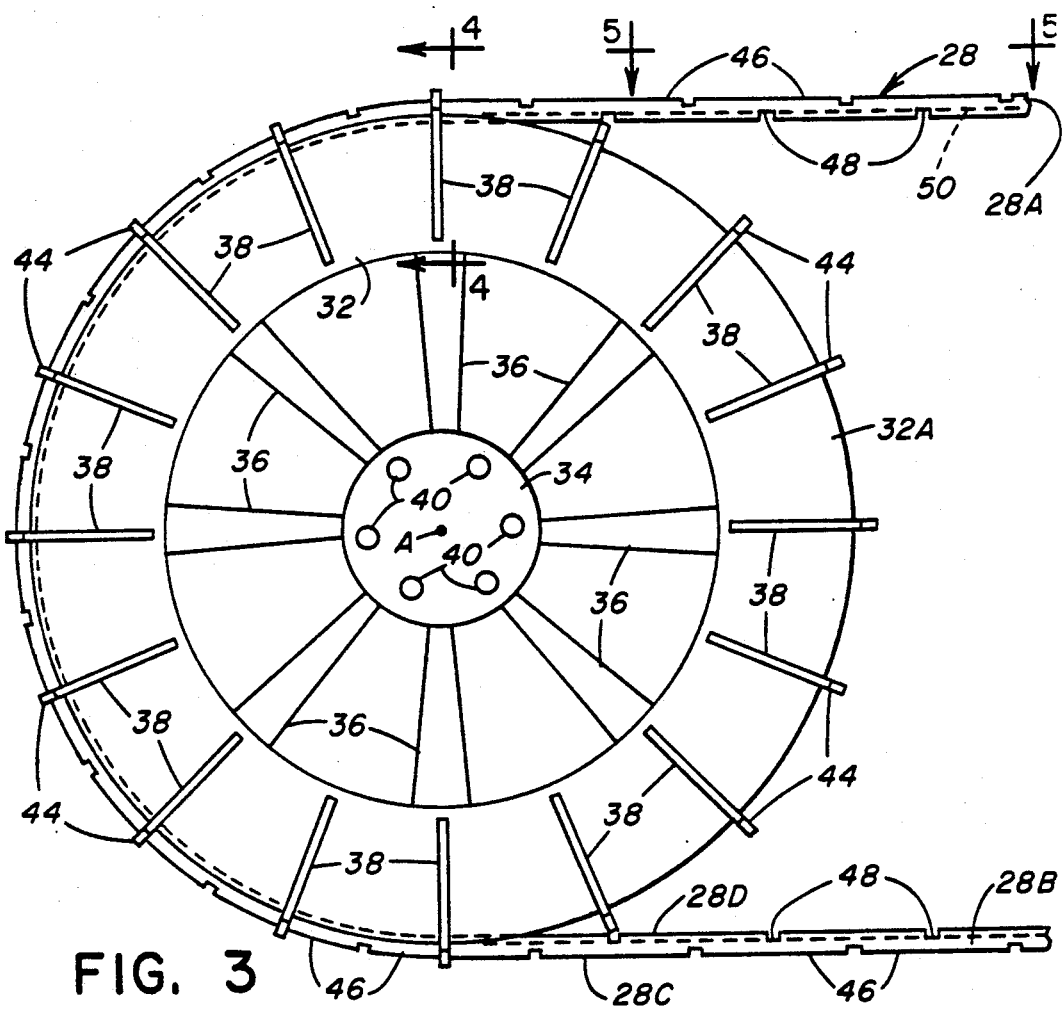
FIG. 3 is an enlarged fragmentary side elevational view of the apparatus of FIG. 1.
Figure 4:
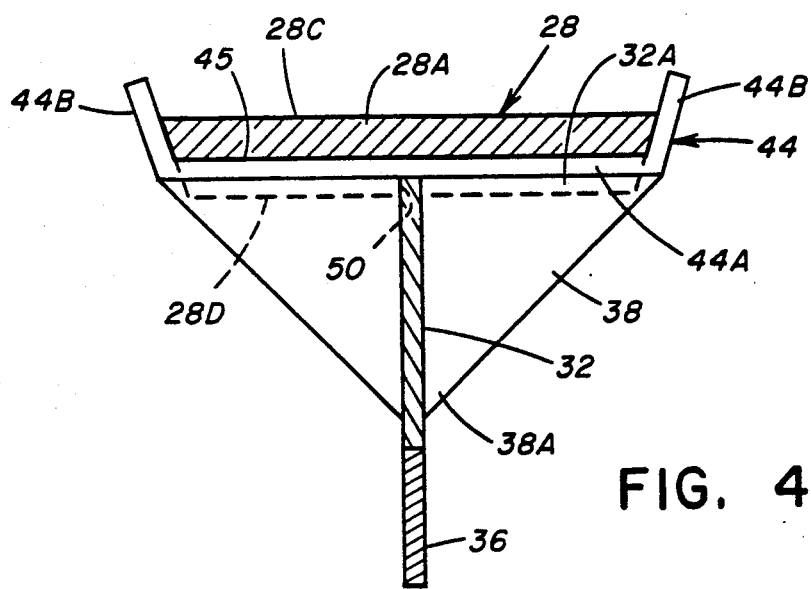
FIG. 4 is an enlarged sectional view of the apparatus taken along line 4—4 of FIG. 3.

Referring to FIGS. 3 and 4, each drive wheel 24, 26 of the apparatus 10 includes an outer annular plate 32, a central hub 34, a plurality of spokes 36, and a plurality of lugs 38. The outer annular plate 32 of each wheel 24, 26 defines a plane aligned in the direction of travel of the traction belt 28 and therewith the support frame 12 over the ground. The central hubs 34 of the wheel 24, 26 are mounted by bolts 40 to the respective power units 30 located at the leading and trailing corners 12A, 12B of the support frame 12. Upon operation of the power units 30, the central hubs 34 and the outer annular plate 32 are rotatably driven about generally parallel horizontal rotational axes A, as seen in FIGS. 1 and 2. The sets of spokes 36 which extending arcuately and radially with respect to the rotational axes A support the outer annular plates 32 on the central hubs 34 of the respective wheels 24, 26 in concentric relation about the rotational axes A.

The lugs 38 of each wheel 24, 26 are attached to and project outwardly from the outer periphery 32A of the outer annular plate 32 in circumferentially spaced relation to one another. Also, the lugs 38 of each wheel 24, 26 extend in transverse relation to the vertical plane defined by the outer annular plate 32. More particularly, each lug 38 is a triangular-shaped plate, projecting outwardly from the annular plate 32 in radial relation to the rotational axis A of the central hub 34. Each lug plate 38 has a central slot 42 extending from an inner apex corner 38A defined by the triangular plate 38, in radial direction relative to the rotational axis A of the central hub 34, toward an outer edge defined on the triangular lug plate 38. The slot 42 provides the means by which the lug plate 38 is fitted on and rigidly attached to the outer periphery 32A of the annular plate 32. Each lug plate 38 also includes on its outer edge a generally U-shaped belt retainer 44 having a transverse base 44A and a pair of ears 44B projecting in oppositely inclined relation from opposite ends of the base 44A. The belt retainer 44 defines a recess 45 which extends in transverse relation to the slot 42. The traction belt 28 entrained over the wheel 24, 26 extends through the recess 45, between the inclined ears 44B and seats upon the base 44A of the belt retainer 44.

The traction belt 28 of the apparatus 10 has treads 46 defined on an outer surface 28C of the belt for engaging the ground and providing traction for causing movement of the support frame 12. The traction belt 28 also has means defined on an inner surface 28D of the belt for engaging the lug plates 38 and the outer annular plate 32 of each wheel 24, 26 such that rotation of the lug plates 38 with the wheels 24, 26 causes movement of the belt 28 about the endless path with its lower run 28B engaged with the ground.

More particularly, the means on the inner surface 28D of the traction belt 28 is a plurality of spaced apart transverse channels 48 and a continuous longitudinal central groove 50 defined in the inner surface of the belt. The spaced transverse grooves 48 receive the outer transverse bases 44A of the belt retainers 44 on the lug plates 38 of the wheel 24, 26 as the belt 28 seats in the outer recesses 45 of the lug plates. The longitudinal central groove 50 receives the portions of the outer periphery 32A of the outer annular plate 32 extending between the lug plates 38.

The interfitting engagement of the belt channels 48 and groove 50 with the wheel lug plate belt retainers 44 and annular plate outer periphery 32A ensure proper alignment of the belt 28 with the wheels 24, 26. Also, such engagement prevents the belt 28 from running off one or the other of the opposite sides of the wheels 24, 26.

The wheels 24, 26 and traction belt 28 of such constructions provide a large footprint which allows improved traction and minimizes formation of ruts. Less energy is needed to run the equipment and reduced damage to crops occurs. Also, the wheel and belt constructions promote self-cleaning and shedding of mud and debris from them as they travel across the ground in moving the mobile irrigation equipment about the fields.

Referring to FIGS. 1 and 2, a belt tension adjuster idler wheel 52 is mounted by a support brace 54 to the upper and lower braces 20, 22 so as to overlie and engage the outer surface 28C of the upper run 28A of the traction belt 28. The vertical position of the idler wheel 52 can be adjusted for adjusting the desired amount of tension on the belt. Also, as seen in FIG. 1, a pair of bogie wheels 56 are mounted by support braces 58 to the upper and lower braces 20, 22 so as to overlie and engage the inner surface 28D of the lower run 28B of the traction belt 28 for maintaining the lower run 28B of the belt 28 against the surface of the ground G. Preferably, the bogie wheels 56 have the same construction as the drive wheels 24, 26.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A belt traction apparatus for use with mobile irrigation equipment, said apparatus comprising:
   (a) a plurality of rotatably-mountable drive wheels;
   (b) an endless traction belt entrained over said drive wheels for engaging the ground; and
   (c) a power unit operable to rotatably drive said drive wheels and thereby move said traction belt along an endless path over the ground;
   (d) each said drive wheel including an annular plate aligned in the direction of travel of said traction belt over the ground, a central hub mountable for rotation about an axis, means for supporting said annular plate on said hub in concentric relation about said rotational axis of said hub, a plurality of lugs, and means for attaching each said lug to the periphery of said annular plate in circumferentially spaced relation to one another and extending in transverse relation to said annular plate and in a radial direction relative to said rotational axis of said hub;
   (e) said belt having treads defined on an outer surface of said belt for engaging the ground and means defined on an inner surface of said belt for engaging said lugs and annular plate of each wheel such that rotation of said lugs with said wheel causes movement of said belt along said endless path over the ground.

2. The apparatus of claim 1 wherein each said lug has a central slot extending from an inner edge of said lug in radial relation to said rotational axis of said hub, said slot providing the means by which each said lug is attached to said periphery of said annular plate.

3. The apparatus of claim 1 wherein each said lug also has an outer recess extending in transverse relation to said annular plate for receiving said traction belt entrained over said wheel.

4. The apparatus of claim 1 wherein said means defined on said inner surface of said traction belt includes a plurality of spaced apart transverse channels defined in said inner surface of said belt for receiving outer edge portions of said lugs of said wheel.

5. The apparatus of claim 1 wherein said means defined on said inner surface of said traction belt includes a continuous longitudinal central groove defined in said inner surface of said belt for receiving said periphery of said annular plate between said lugs.

6. The apparatus of claim 1 wherein each said lug is a triangular-shaped plate extending in a transverse relation to said annular plate, projecting outwardly from said annular plate in radial relation to the rotational axis of said wheel hub.

7. The apparatus of claim 6 wherein each said lug has a central slot extending from an inner apex corner on said triangular plate, in radial relation to the rotational axis of said wheel hub, toward an outer base edge on said triangular plate, said slot providing the means by which each said lug is attached to the periphery of said annular plate.

8. The apparatus of claim 7 wherein each said lug also has a recess formed in said outer base edge extending in transverse relation to said slot for receiving said belt.

9. The apparatus of claim 8 wherein said means defined on said inner surface of said traction belt includes:
   a plurality of spaced apart transverse channels defined in said inner surface of said belt for receiving said outer base edges of said lugs of said wheel; and
   a continuous longitudinal central groove defined in said inner surface of said belt for receiving said periphery of said annular plate extending between said lugs.

10. In mobile irrigation equipment including a water delivery tube, a support frame mounting said tube, and a belt traction apparatus movably mounted to said support frame and operable for moving said support frame over the ground, said apparatus comprising:
    (a) a plurality of drive wheels rotatably mounted to leading and trailing ends of said support frame;
    (b) an endless traction belt entrained over said drive wheels for engaging the ground; and
    (c) a power unit mounted to said support frame and drivingly coupled to at least one of said drive wheels, said power unit being operable to rotatably drive said wheel and thereby move said traction belt along an endless path for moving said support frame over the ground;
    (d) each said drive wheel including an annular plate aligned in the direction of travel of said traction belt over the ground, a central hub mountable for rotation about an axis, means for supporting said annular plate on said hub in concentric relation about said rotational axis of said hub, a plurality of lugs, and means for attaching each said lug to the periphery of said annular plate in circumferentially spaced relation to one another and extending in transverse relation to said annular plate and in a radial direction relative to said rotational axis of said hub;
    (e) said traction belt having treads defined on an outer surface of said belt for engaging the ground and means defined on an inner surface of said belt for engaging said lugs and annular plate of each wheel such that rotation of said lugs with said wheel causes movement of said belt along said endless path over the ground.

11. The apparatus of claim 10 wherein each said lug has a central slot extending from an inner edge of said lug in radial relation to said rotational axis of said hub, said slot providing the means by which each said lug is attached to said periphery of said annular plate.

12. The apparatus of claim 10 wherein each said lug also has an outer recess extending in transverse relation to said annular plate for receiving said traction belt entrained over said wheel.

13. The apparatus of claim 10 wherein said means defined on said inner surface of said traction belt includes a plurality of spaced apart transverse channels defined in said inner surface of said belt for receiving outer edge portions of said lugs of said wheel.

14. The apparatus of claim 10 wherein said means defined on said inner surface of said traction belt includes a continuous longitudinal central groove defined in said inner surface of said belt for receiving said periphery of said annular plate between said lugs.

15. The apparatus of claim 10 wherein each said lug is a triangular-shaped plate extending in a transverse relation to said annular plate, projecting outwardly from said annular plate in radial relation to the rotational axis of said wheel hub.

16. The apparatus of claim 15 wherein each said lug has a central slot extending from an inner apex corner on said triangular plate, in radial relation to the rotational axis of said wheel hub, toward an outer base edge on said triangular plate, said slot providing the means by which each said lug is attached to the periphery of said annular plate.

17. The apparatus of claim 16 wherein each said lug also has a recess formed in said outer base edge extending in transverse relation to said slot for receiving said traction belt.

18. The apparatus of claim 17 wherein said means defined on said inner surface of said traction belt includes:
   a plurality of spaced apart transverse channels defined in said inner surface of said belt for receiving said outer base edges of said lugs of said wheel; and
   a continuous longitudinal central groove defined in said inner surface of said belt for receiving said periphery of said annular plate extending between said lugs.

19. In mobile irrigation equipment including a water delivery tube, a support frame mounting said tube, and a belt traction apparatus movably mounted to said support frame and operable for moving said support frame over the ground, said apparatus comprising:
   (a) a plurality of drive wheels rotatably mounted to leading and trailing ends of said support frame;
   (b) an endless traction belt entrained over said drive wheels for engaging the ground; and
   (c) a power unit mounted to said support frame and drivingly coupled to said drive wheels, said power unit being operable to rotatably drive said wheels and thereby move said traction belt along an endless path for moving said support frame over the ground;
   (d) each drive wheel including an annular plate, a central hub mounted to said support frame for rotation about an axis, means for supporting said annular plate on said hub in concentric relation with said rotational axis of said hub, and a plurality of lugs attached to the periphery of said annular plate in circumferentially spaced relation to one another and extending in transverse relation to said annular plate and in radial relation to said rotational axis of said hub, each said lug having a central slot extending from an inner edge of said lug in radial relation to said rotational axis of said hub by which said lug is fitted on said periphery of said annular plate, each said lug also having an outer recess extending in transverse relation to slot for receiving said belt entrained over said wheel;
   (e) said traction belt having treads defined on an outer surface of said belt for engaging the ground and a plurality of spaced apart transverse channels defined in an inner surface of said belt for receiving edge portions of said lugs of said wheel defining bottoms of said outer recesses of said lugs, said belt also having a continuous longitudinal central groove defined in said inner surface of said belt for receiving said periphery of said annular plate.

20. The apparatus of claim 19 wherein each said lug is a triangular-shaped plate extending in a transverse relation to said annular plate, projecting outwardly from said annular plate in radial relation to the rotational axis of said wheel hub, said central slot extending from an inner apex corner on said triangular plate, in radial relation to the rotational axis of said wheel hub, toward an outer base edge on said triangular plate, said outer recess being formed in said outer base edge extending in transverse relation to said slot for receiving said traction belt.

* * * * *